(12) United States Patent
Wang et al.

(10) Patent No.: US 11,713,918 B2
(45) Date of Patent: Aug. 1, 2023

(54) ENGAGING ASSEMBLY, DRAWER AND REFRIGERATOR HAVING THE SAME

(71) Applicant: QINGDAO HAIER CO., LTD., Qingdao (CN)

(72) Inventors: Jing Wang, Qingdao (CN); Bin Fei, Qingdao (CN); Xiaobing Zhu, Qingdao (CN); Xueli Cheng, Qingdao (CN)

(73) Assignee: QINGDAO HAIER CO., LTD., Qingdao (CN)

(*) Notice: Subject to any disclaimer, the term of this patent is extended or adjusted under 35 U.S.C. 154(b) by 0 days.

(21) Appl. No.: 17/533,097

(22) Filed: Nov. 22, 2021

(65) Prior Publication Data

US 2022/0082322 A1 Mar. 17, 2022

Related U.S. Application Data

(62) Division of application No. 16/753,759, filed on Apr. 3, 2020, now Pat. No. 11,209,207.

(30) Foreign Application Priority Data

Apr. 25, 2018 (CN) .......................... 201810380307.7

(51) Int. Cl.
| | | |
|---|---|---|
| *F25D 25/02* | (2006.01) | |
| *A47B 88/497* | (2017.01) | |
| *A47B 88/453* | (2017.01) | |
| *A47B 88/477* | (2017.01) | |
| *F16C 29/00* | (2006.01) | |

(52) U.S. Cl.
CPC .......... *F25D 25/025* (2013.01); *A47B 88/453* (2017.01); *A47B 88/477* (2017.01); *A47B 88/497* (2017.01); *F16C 29/005* (2013.01); *F16C 2314/72* (2013.01)

(58) Field of Classification Search
CPC ... A47B 88/453; A47B 88/477; A47B 88/497; F25D 25/025; F16C 29/005; F16C 2314/72
See application file for complete search history.

(56) References Cited

U.S. PATENT DOCUMENTS

| | | | |
|---|---|---|---|
| 2006/0250059 A1* | 11/2006 | Lemm .................. | A47B 88/467 312/331 |
| 2012/0091872 A1* | 4/2012 | Matthes ................. | A47B 88/45 74/89.17 |
| 2013/0270987 A1* | 10/2013 | Kelly .................... | F25D 25/025 312/331 |

FOREIGN PATENT DOCUMENTS

| | | | | |
|---|---|---|---|---|
| EP | 2186437 | * | 5/2010 | ............. A47B 88/12 |
| WO | WO 2011/003740 | * | 1/2011 | ............. A47B 88/04 |

* cited by examiner

*Primary Examiner* — James O Hansen
(74) *Attorney, Agent, or Firm* — Cheng-Ju Chiang

(57) ABSTRACT

An engagement assembly, a drawer, and a refrigerator having same. The engagement assembly comprises a first engagement part matching the drawer and a second engagement part matching a refrigerator body; one of the first and second engagement parts is a gear, and the other one is a rack; the rack has a tooth surface that allows the gear to travel; the rack comprises a main rack and an extension rack; when the drawer is in a closed state, the tooth surface has a first stroke length; when the drawer is in an opening process, the extension rack moves to a travel path of the gear so that the tooth surface has a second stroke length; when the drawer is in a closing process, the extension rack is reset; the first stroke length is smaller than the second stroke length. The length of the tooth surface increases in the opening process.

9 Claims, 14 Drawing Sheets

ENGAGING ASSEMBLY, DRAWER AND REFRIGERATOR HAVING THE SAME

CROSS REFERENCE TO RELATED APPLICATIONS

The present application is a divisional application of U.S. patent application Ser. No. 16/753,759, filed on Apr. 3, 2020, which is a 35 U.S.C. § 371 National Phase conversion of International (PCT) Patent Application No. PCT/CN2018/122073, filed on Dec. 19, 2018, which claims priority to Chinese Patent Application No. 201810380307.7, filed on Apr. 25, 2018, the disclosure of which is incorporated by reference herein.

TECHNICAL FIELD

The present invention relates to the field of household appliances and particularly to an engaging assembly, a drawer and a refrigerator having the same.

BACKGROUND

Currently, refrigerators are requisite household appliances in people's daily life. The refrigerator is usually provided with a drawer in which articles to be refrigerated may be placed and stored.

In the prior art, an opening or closing process of the drawer is usually implemented through a slide rail, which facilitates a user to place or remove foods into or from the drawer. However, due to the limitation of a sliding path of the slide rail, the distance through the drawer may be pulled out is also limited, which does not facilitate the user to place or remove foods into or from the drawer.

SUMMARY

An object of the present invention is to provide an engaging assembly, a drawer and a refrigerator having the same.

To achieve one of the above objects of the present invention, an embodiment of the present invention provides an engaging assembly for assisting in opening or closing a drawer. The engaging assembly comprises a first engaging portion that engages with a drawer and a second engaging portion that engages with a cabinet, one of the first engaging portion and the second engaging portion is a gear, and the other is a rack, the rack has a tooth surface enabling the gear to travel, and the rack comprises a main rack and an extension rack; when the drawer is in a closed state, the tooth surface has a first travel length; when the drawer is in an opening process, the extension rack moves onto a travel path of the gear so that the tooth surface has a second travel length; when the drawer is in a closing process, the extension rack returns, and the first travel length is shorter than the second travel length.

As a further improvement of an embodiment of the present invention, the first engaging portion is a gear, and the second engaging portion is a rack.

As a further improvement of an embodiment of the present invention, the main rack comprises a first end portion and a second end portion which are arranged opposite to each other, the direction from the first end portion to the second end portion is the direction in which the drawer is opened, a receiving space is disposed in a region adjacent to the second end portion, and the extension rack is movably disposed in the receiving space; when the drawer is in the opening process, the extension rack moves in the receiving space so that the extension rack protrudes beyond the second end portion in a direction away from the first end portion.

As a further improvement of an embodiment of the present invention, the main rack has a main tooth surface, the extension rack has an extension tooth surface, and when the drawer is in the opening process, the extension rack moves in the receiving space so that the extension tooth surface and the main tooth surface are spliced into a continuous tooth surface.

As a further improvement of an embodiment of the present invention, the receiving space comprises a bottom portion away from the main tooth surface and a top portion adjacent to the main tooth surface; when the drawer is in the closed state, the extension rack is located between the bottom portion and the top portion; when the drawer is in the opening process, the extension rack moves close to the top surface so that the extension tooth surface and the main tooth surface are spliced into a continuous tooth surface.

As a further improvement of an embodiment of the present invention, the main tooth surface comprises a rear main tooth surface located in an intermediate region between the top portion and the first end portion, and a front main tooth surface located at the top portion, and the rear main tooth surface is continuous with the front main tooth surface.

As a further improvement of an embodiment of the present invention, the engaging assembly further comprises a driving member, and the extension rack has an adapting portion that engages with the driving member; when the drawer is in a closed state, the driving member abuts against the adapting portion so that the extension rack is located between the bottom portion and the top portion; when the drawer is in the opening process, the driving member disengages from the adapting portion to cause the extension rack to move close to the top portion; when the drawer is in the closing process, the driving member abuts against the adapting portion so that the extension rack moves close to the bottom portion.

As a further improvement of an embodiment of the present invention, an elastic member is provided between the extension rack and the bottom portion, and when the driving member disengages from the adapting portion, the elastic member drives the extension rack to move close to the top portion.

As a further improvement of an embodiment of the present invention, the receiving space has a side wall connecting the bottom portion with the top portion, the side wall is provided with at least one travel slot, and the extension rack is provided with a projection mating with the travel slot; when the driving member disengages from the adapting portion, the projection slides in the travel slot to drive the extension rack to move closer to the top portion.

As a further improvement of an embodiment of the present invention, an angle in a direction away from the first end portion is provided between the travel slot and the bottom portion, and the angle is an acute angle.

As a further improvement of an embodiment of the present invention, the receiving space has two side walls disposed opposite each other, and each side wall has two travel slots distributed in parallel.

As a further improvement of an embodiment of the present invention, the extension rack and the receiving space cooperate with each other so that the extension tooth surface and the main tooth surface are always at the same height; when the drawer is in the opening process, the extension rack moves in a direction away from the first end portion so that the extension tooth surface and the main tooth surface are spliced into a continuous tooth surface.

As a further improvement of an embodiment of the present invention, the main tooth surface comprises a rear main tooth surface adjacent to the first end portion and a front main tooth surface adjacent to the second end portion, and the rear main tooth surface is continuous with the front main tooth surface; when the drawer is in a closed state, the extension tooth surface is disposed adjacent to the front main tooth surface; when the drawer is in the opening process, the extension tooth surface moves in a direction away from the front main tooth surface; when the drawer is in the closing process, the extension tooth surface moves in a direction close to the front main tooth surface.

As a further improvement of an embodiment of the present invention, the engaging assembly further comprises a driving member connected to the extension rack; when the drawer is in the opening process, the driving member drives the extension rack to move in a direction away from the first end portion; when the drawer is in the closing process, the driving member drives the extension rack to move in a direction close to the first end portion.

As a further improvement of an embodiment of the present invention, the driving member comprises a link, a slider and a driving block, and the link is used to connect the extension rack with the slider; when the drawer is in the closed state, the driving block and the slider engage with each other; when the drawer is in the opening process, the driving block drives the extension rack to move in a direction away from the first end portion via the slider and the link; when the drawer is in the closing process, the driving block drives the extension rack to move in a direction close to the first end portion via the slider and the link.

As a further improvement of an embodiment of the present invention, an accommodating slot for accommodating the driving member and the extension rack is provided in the receiving space, the accommodating slot comprises two side walls disposed opposite each other, each side wall is provided with a first slot for limiting a moving direction of the slider, the first slot comprises a first section adjacent to the first end portion and a second section adjacent to the second end portion, the second section is away from the main tooth surface relative to the first section, and the slider is movably connected to the link; when the drawer is in the opening process, the driving block drives the slider to travel from the first section to the second section, and then the slider rotates relative to the link so that the driving block disengage from the slider; when the drawer is in the closing process, the driving block engages with the slider and drives the slider to travel from the second section to the first section.

As a further improvement of an embodiment of the present invention, the slider is provided with a notch that engages with the driving block, and the driving member further comprises a return spring connected to the slider; when the drawer is in the opening process and the slider enters the second section, the slider rotates in a direction away from the first end portion, and one side of the notch is inclined so that the driving block disengages from the notch; when the drawer is in the closing process, the driving block enters the notch from the inclined side of the notch, and the return spring drives the slider to rotate in a direction close to the first end portion so that the driving block and the notch engage with each other, and the return spring drives, via the slider, the driving block, the link and the extension rack to move together toward the first end portion.

As a further improvement of an embodiment of the present invention, a post is provided at a connection of the slider and the link, the side wall further has a second slot for restricting the moving direction of the extension rack and a third slot for restricting the moving direction of the post, and a length of the second slot is equal to a length of the third slot.

In order to achieve one of the above-mentioned objects of the present invention, an embodiment of the present invention provides a drawer comprising a slide rail mechanism, the slide rail mechanism comprises the engaging assembly as described above, the slide rail assembly has an upper rail, a middle rail and a lower rail that are slidingly fitted to each other, the lower rail is connected to the cabinet, the middle rail is movably connected to the upper rail and the lower rail, the upper rail is connected to the drawer, the gear is connected to the upper rail, and the rack is connected to the cabinet and/or the lower rail.

In order to achieve one of the foregoing objectives of the present invention, an embodiment of the present invention provides a refrigerator comprising the drawer as described above.

Compared with the prior art, the present invention has the following advantageous effects: the length of the tooth surface of the rack according to an embodiment of the present invention is variable and becomes larger in the opening process of the drawer, so that the pull-out distance of the drawer becomes larger, which facilitates the user to have access to articles in the drawer and improves the user experience; in addition, the length of the tooth surface increases only in the opening process of the drawer, the length of the tooth surface is small when the drawer is in the closed state, and the existence of extension racks does not hinder the normal opening or closing process of the drawer.

DETAILED DESCRIPTION

The present invention will be described in detail below with reference to specific embodiments shown in the accompanying drawings. However, these embodiments do not limit the present invention. Structural, methodological or functional variations made by those skilled in the art based on these embodiments are all included in the protection scope of the present invention.

In the figures of the present application, some dimensions of the structures or parts may be exaggerated relative to other structures or parts for convenience of illustration, and therefore they are only used to illustrate basic structures of the subject matter of the present application.

In addition, the terms "left", "right", "left side", "right side", and the like as used here, which denote spatial relative positions, describe the relationship of a unit or feature relative to another unit or feature in the accompanying drawings for the purpose of illustration. The terms of the spatial relative positions may be intended to include different orientations of the device in use or operation other than the orientations shown in the accompanying drawings. For example, the units that are described as being located on the "below" or "beneath" other units or features will be located "above" other units or features if the device in the accompanying drawings is turned upside down. Thus, the exemplary term "below" can encompass both the orientations of above and below. The device may be otherwise oriented (rotated by 90 degrees or facing other directions) and the space-related descriptors used here are interpreted accordingly.

An embodiment of the present invention provides a refrigerator (not shown). The specific structure of the refrigerator may be found from depictions of refrigerators in the prior art and will not be detailed any more here.

Figure 1:
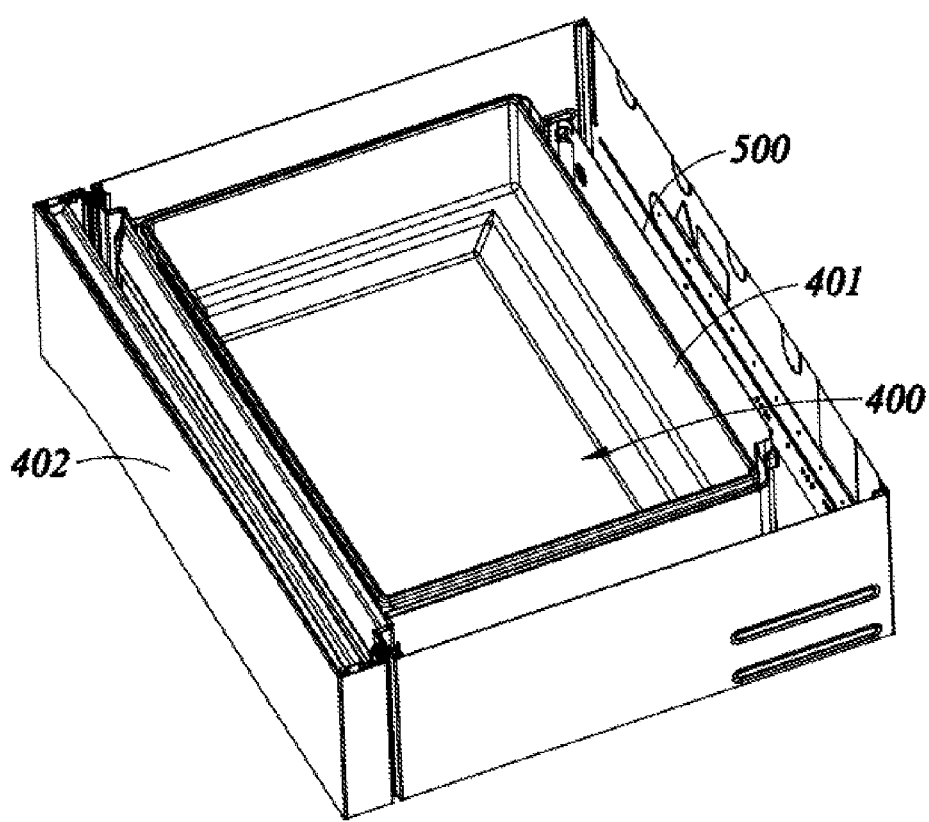
FIG. 1 is a schematic diagram of a closed state of a drawer according to an embodiment of the present invention.
Figure 2:
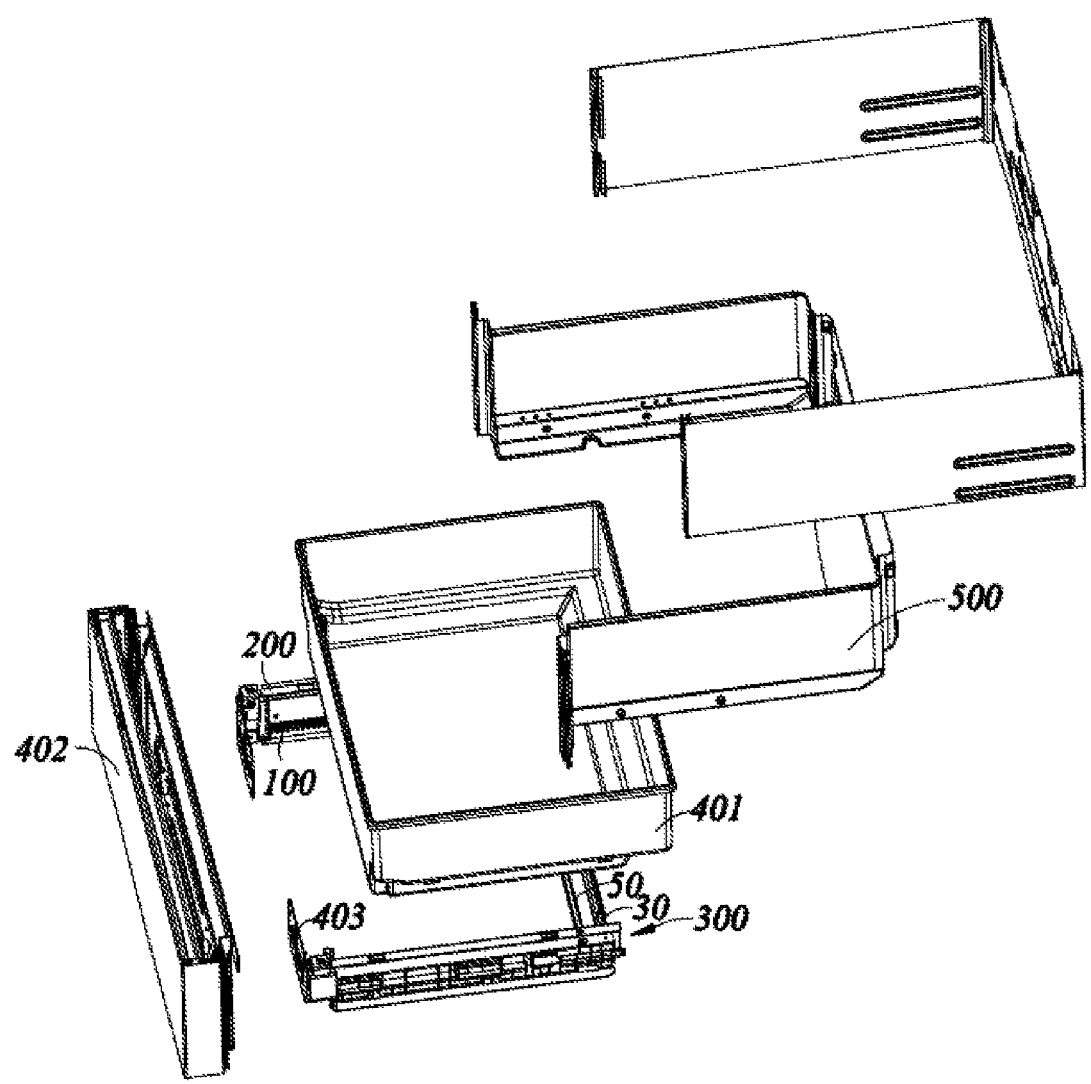
FIG. 2 is an exploded view of FIG. 1.

With reference to FIG. 1 and FIG. 2, a drawer 400 is provided in a refrigerator cabinet 500, and the drawer 400 can be opened or closed relative to the cabinet 500.

The drawer 400 includes a drawer body 401 and a drawer door body 402 connected to the drawer body 401. The drawer body 401 is driven into and out of the cabinet 500 by acting on the drawer door body 402.

The drawer 400 further includes a slide rail mechanism 300. The slide rail mechanism 300 is disposed between the drawer 400 and the cabinet 500. The slide rail mechanism 300 is used to assist in opening or closing the drawer 400 relative to the cabinet 500.

The slide rail mechanism 300 includes an engaging assembly 100 and a slide rail assembly 200 that engage with each other.

Figure 3:
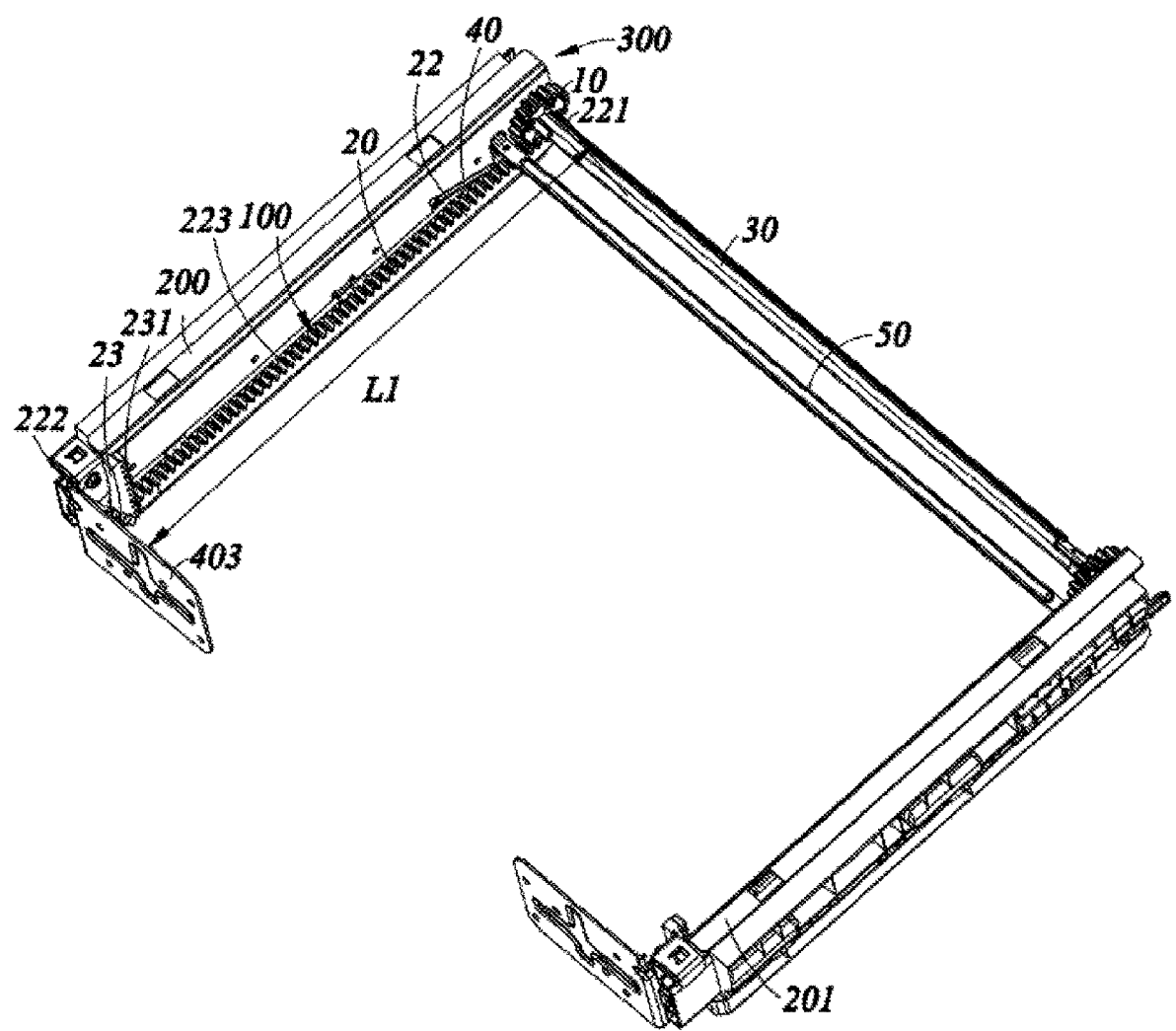
FIG. 3 is a schematic view of a closed state of a slide rail mechanism according to an embodiment of the present invention.
Figure 4:
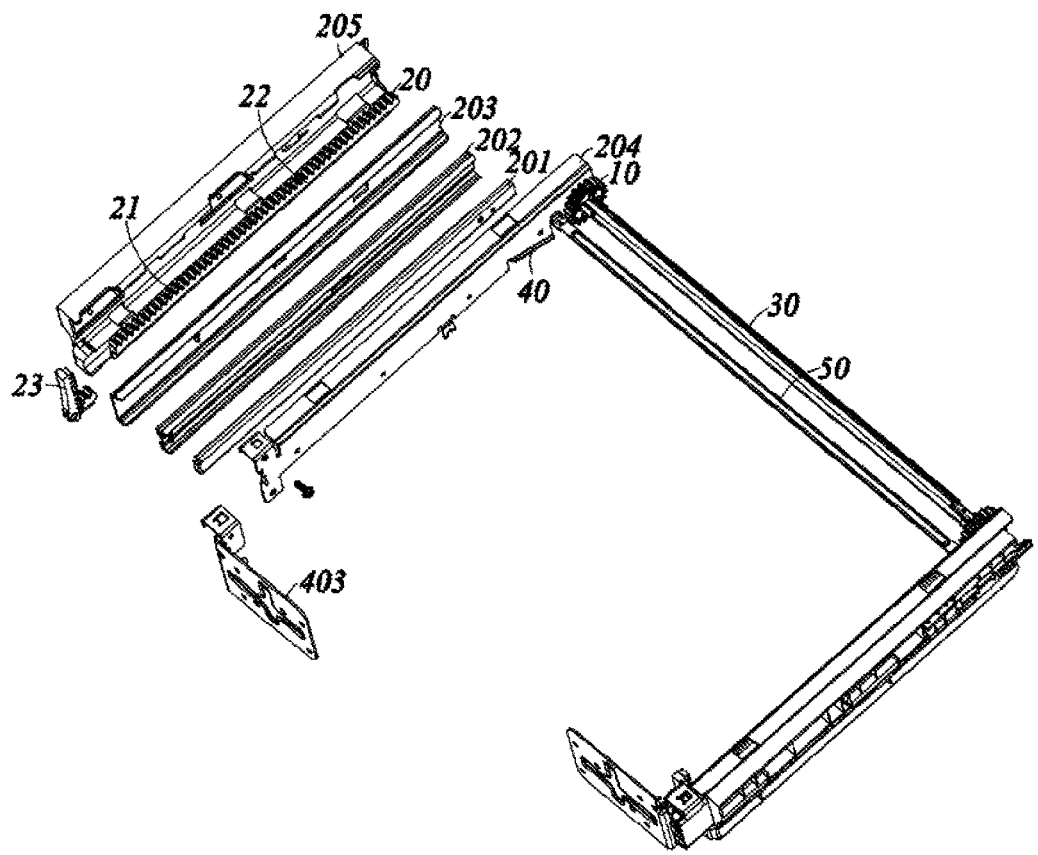
FIG. 4 is an exploded view of a partial portion of FIG. 3.

In the present embodiment, with reference to FIG. 3 and FIG. 4, the slide rail mechanism 300 includes two slide rail assemblies 200 and two engaging assemblies 100 located on opposite sides of the drawer 400, but is not limited thereto.

Here, the two engaging assemblies 100 (and the two sliding assemblies 200) are located on the left and right sides of the drawer 400, respectively, but the distribution thereof are not limited thereto. The two engaging assemblies 100 (and the two sliding assemblies 200) may also be distributed in other forms.

The slide rail assembly 200 has an upper rail 201, a middle rail 202 and a lower rail 203 that are slidably fitted to each other. The lower rail 203 is connected to the cabinet 500, the middle rail 202 is movably connected to the upper rail 201 and the lower rail 203, and the upper rail 201 is connected to the drawer 400.

In use, the lower rail 203 is fixed, and the middle rail 202 and the upper rail 201 are openable and closeable relative to the lower rail 203, thereby driving the drawer 400 to be opened or closed in the cabinet 500, that is, the lower rail 203 is a fixed rail, and the middle rail 202 and the upper rail 201 are moveable rails.

The engaging assembly 100 is used to assist in opening or closing the drawer 400.

The engaging assembly 100 includes a first engaging portion 10 that engages with the drawer 400 and a second engaging portion 20 that engages with the cabinet 500.

The first engaging portion 10 is disposed at the upper rail 201.

Here, a bracket 204 is further connected to a side of the upper rail 201 away from the lower rail 203, the upper rail 201 and the bracket 204 are fixed to each other, and the first engaging portion 10 substantially engages with the bracket 204.

A connecting sheet 403 is further provided between both ends of the drawer door body 402 and the two brackets 204.

Here, the connecting sheet 403 is fixed to the bracket 204 and the drawer door body 402, and the drawer body 401 is also fixed to the bracket 204, thereby implementing mutual fixation of the drawer door body 402 and the drawer body 401.

The second engaging portion 20 is connected to the cabinet 500 and/or the lower rail 203.

Here, a fixed frame 205 is connected to one end of the second engaging portion 20, a cavity is formed between the second engaging portion 20 and the fixed frame 205, the upper rail 201, the middle rail 202, the lower rail 203 and the bracket 204 are located in the cavity, and the fixed frame 205 and the lower rail 203 are fixed to each other.

It should be noted that the positions of the first engaging portion 10 and the second engaging portion 20 are not limited to the above description, and may be determined according to actual conditions so long as it is ensured that the first engaging portion 10 and the second engaging portion 20 can engage with each other to open or close the drawer 400 relative to the cabinet 500.

In the present embodiment, one of the first engaging portion 10 and the second engaging portion 20 is a gear, and the other is a rack.

In the present embodiment, an example is taken in which the first engaging portion 10 is a gear 10 and the second engaging portion 20 is a rack 20, but the arrangement is not limited thereto.

Here, the gear 10 is an independent gear. In other embodiments, the gear 10 may be a gear set formed by a plurality of gears.

The rack 20 has a tooth surface 21 for the gear 10 to travel thereon. The rack 20 includes a main rack 22 and an extension rack 23.

Figure 5:
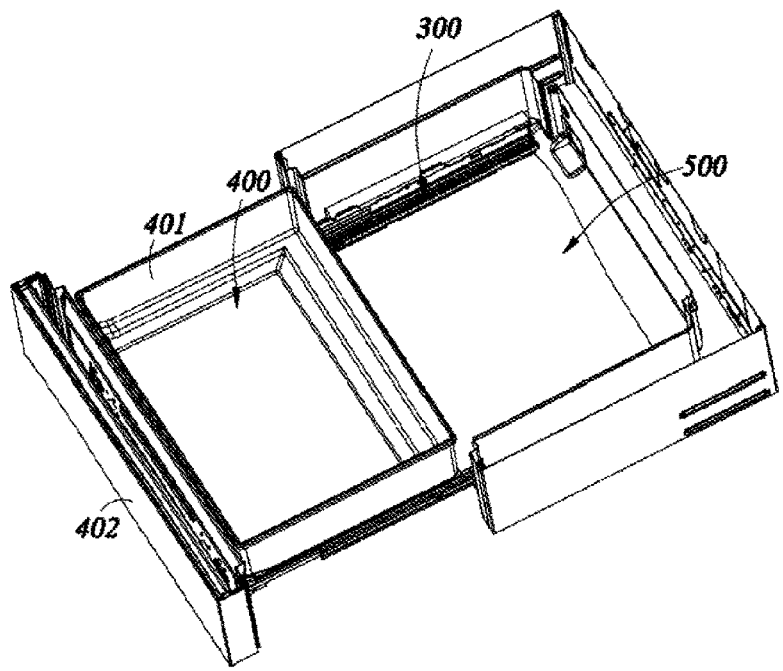
FIG. 5 is a schematic view of an open state of a drawer according to an embodiment of the present invention.
Figure 6:
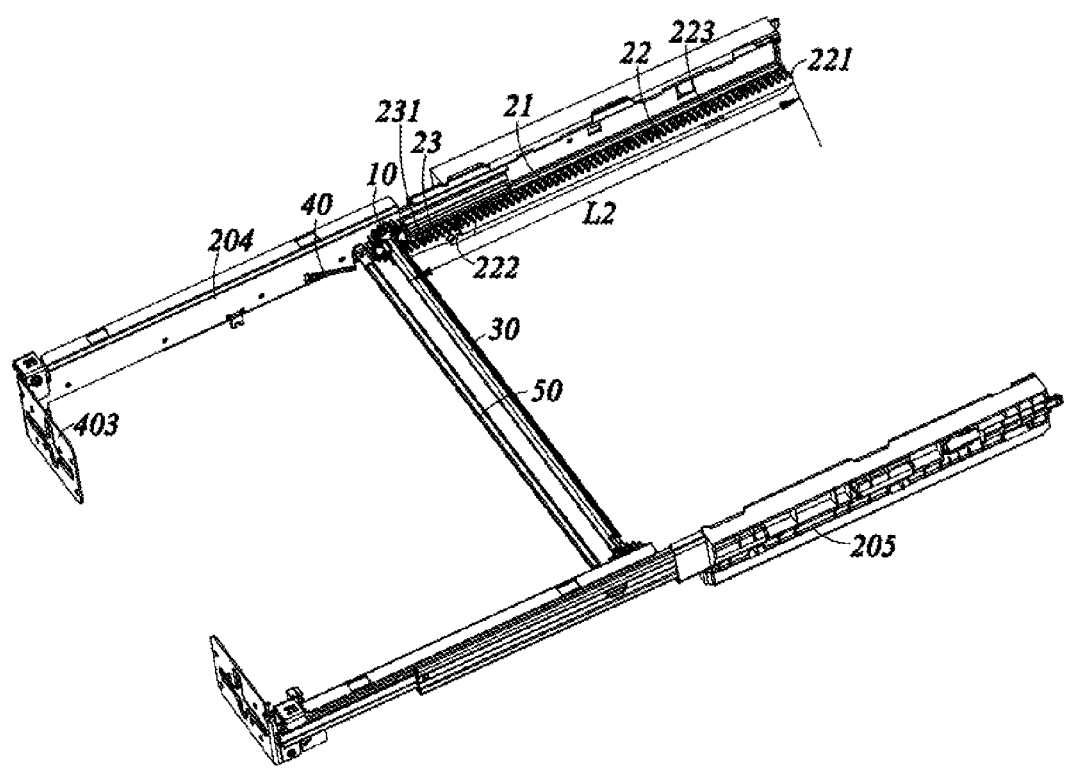
FIG. 6 is a schematic view of an open state of a slide rail mechanism according to an embodiment of the present invention.

With reference to FIG. 3 and FIG. 4, when the drawer 400 is in the closed state, the tooth surface 21 has a first travel length L1. With reference to FIG. 5 and FIG. 6, when the drawer 400 is in the opening process, the extension rack 23 moves onto a travel path of the gear 10 so that the tooth surface 21 has a second travel length L2. When the drawer 400 is in the closing process, the extension rack 23 returns, and the first travel length L1 is smaller than the second travel length L2.

Here, the "tooth surface 21" refers to a region where the gear 10 can roll, and the "travel path of the gear 10" refers to a region through which the gear 10 passes while the drawer 400 is pushed in or pulled out.

In addition, the extension rack 23 may be in a moving state during the entire opening process of the drawer 400, or the extension rack 23 may only start to move after the drawer 400 is opened a certain distance, or the drawer 400 is still in the opening process after completion of the movement of the extension rack 23, which will be specifically determined according to actual situations.

It can be seen that the length of the tooth surface 21 of the rack 20 of the present embodiment is variable, and the length of the tooth surface 21 becomes larger during the opening of the drawer 400, so that the pull-out distance of the drawer 400 becomes larger, which facilitates the user to have access to articles in the drawer 400 and improves the user experience. In addition, the length of tooth surface 21 only increases while the drawer 400 is opened. In the closed state, the length of tooth surface 21 is small. The presence of the extension rack 23 does not hinder the normal opening and closing process of the drawer 400.

It needs to be appreciated that since the slide rail assemblies 200 are further provided on the left and right sides of the drawer 400, the traveling process of the drawer 400 may be further controlled by the slide rail assemblies 200, and the gear 10 may be prevented from directly disengaging from the rack 20 while the drawer 400 is in the opening process.

In the present embodiment, two gears 10 are provided on the left and right sides of the drawer 400. The two gears 10 are connected by a link 30, and the two gears 10 move synchronously, thereby avoiding shaking or jamming during the opening and closing process of the drawer 400.

In addition, a support rod 50 is also connected between the two brackets 204. The support rod 50 is disposed adjacent the link 30. The support rod 50 is used to support the drawer body 401.

It can be seen that in the travelling process of the drawer 400 of the present embodiment, synchronization can be ensured, and it can also be ensured that the drawer 400 has a sufficiently large pull-out distance. Especially for a heavier drawer 400, the stability of the drawer 400 during the entire push-in and pull-out process can be guaranteed.

In the present embodiment, the engaging assembly 100 further includes a driving member 40, the extension rack 23 is movably connected to the main rack 22, and the driving member 40 is used to control the movement of the extension rack 23 relative to the main rack 22 to achieve changes in the length of the tooth surface 21.

It can be appreciated that the extension rack 23 is not necessarily movably connected to the main rack 22, and the extension rack 23 may also be movably connected to other regions, for example, the extension rack 23 is movably connected to the cabinet 500 so long as it can be ensured that the driving member 40 may act upon and move the extension rack 23 to achieve the changes of the length of the tooth surface 21.

The main rack 22 includes a first end portion 221 and a second end portion 222 which are arranged opposite to each other. A direction from the first end portion 221 to the second end portion 222 is the direction in which the drawer 400 is opened.

Here, the first end portion 221 and the second end portion 222 are defined as two opposite side portions of the main rack 22.

The main rack 22 has a main tooth surface 223, and the extension rack 23 has an extension tooth surface 231.

With reference to FIG. 3 and FIG. 4, when the drawer 400 is in a closed state, the tooth surface 21 has the first travel length L1.

With reference to FIG. 5 and FIG. 6, when the drawer 400 is in the opening process, the driving member 40 drives the extension rack 23 to move.

When the drawer 400 is in the open state, the driving member 40 drives the extension rack 23 to move onto the travel path of the gear 10, the extension rack 23 protrudes beyond the second end portion 222 in a direction away from the first end portion 221, and the extension tooth surface 231 is spliced with the main tooth surface 223 into a continuous tooth surface. At this time, plus the portion of the extension rack 23 protruding out of the second end portion 222, the tooth surface 21 has the second travel length L2, and the drawer 400 may be pulled out a longer distance.

Here, the "continuous tooth surface" means that the gear 10 can continuously travel on the tooth surface without interruption.

When the drawer 400 is in the closing process, the driving member 40 drives the extension rack 23 to move.

When the drawer 400 is in the closed state, the extension rack 23 returns so that the tooth surface 21 restores to the first travel length L1.

It may be appreciated that the "closed state" means that the drawer 400 is completely received in the cabinet 500, the "open state" means that the drawer 400 is fully opened, the "opening process" refers to a process in which the drawer 400 changes from the closed state to the open state, and the "closing process" refers to a process in which the drawer 400 changes from the open state to the closed state.

It should be appreciated that the operations of the engaging assembly 100 and the slide rail assembly 200 according to the present embodiment may also be implemented by electric control.

In the following, specific embodiment of the engaging assembly 100 according to the present implementation will be described in detail.

With reference to FIG. 7 through FIG. 12, they are schematic diagrams of the first embodiment of the engaging assembly 100.

Figure 7:
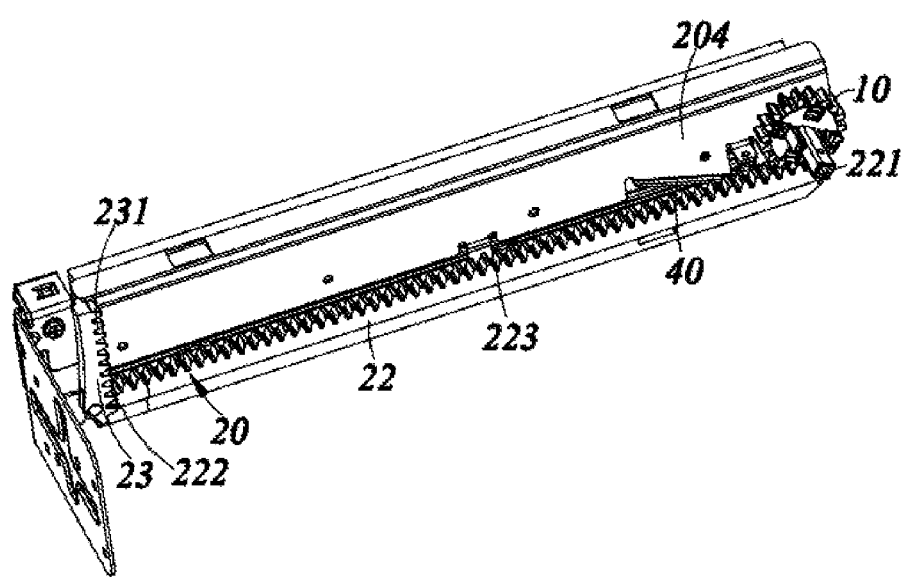
FIG. 7 is a schematic diagram of a closed state of a drawer according to a first embodiment of the present invention.
Figure 8:
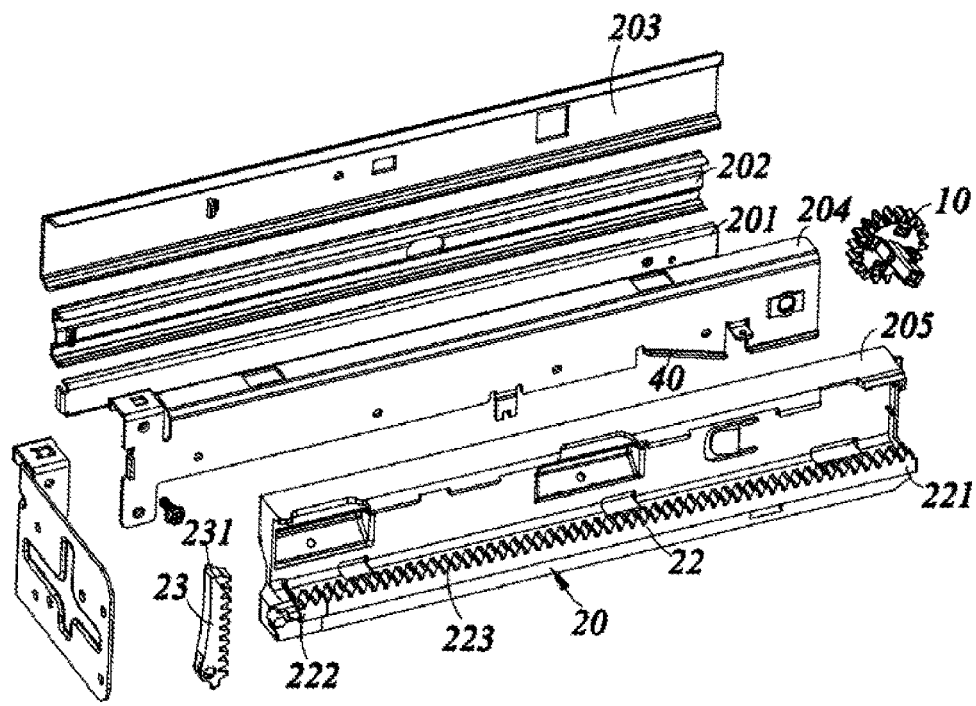
FIG. 8 is an exploded view of FIG. 7.

Referring to FIG. 7 and FIG. 8, the engaging assembly 100 includes a gear 10 connected to a bracket 204 and a rack 20 connected to a cabinet 500 or a lower rail 203.

The rack 20 includes a main rack 22 and an extension rack 23.

The main rack 22 has a main tooth surface 223, and the extension rack 23 has an extension tooth surface 231.

The main rack 22 includes a first end portion 221 and a second end portion 222 which are arranged opposite to each other. A direction from the first end portion 221 to the second end portion 222 is the direction in which the drawer 400 is opened.

The extension rack 23 is pivotally connected to the second end portion 222 of the main rack 22.

Figure 9:
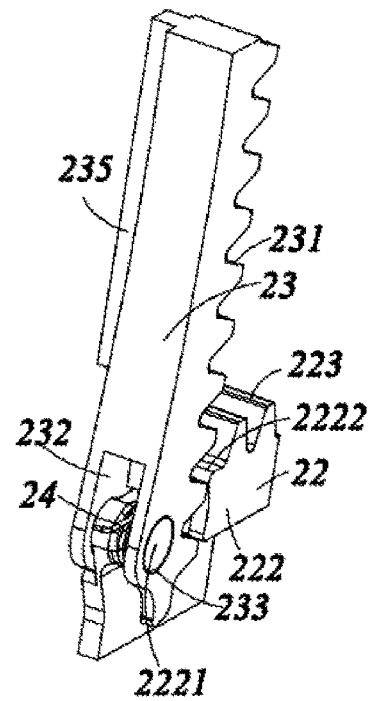
FIG. 9 is a schematic diagram of the cooperation of a main rack and an extension rack according to a first embodiment of the present invention.
Figure 10:
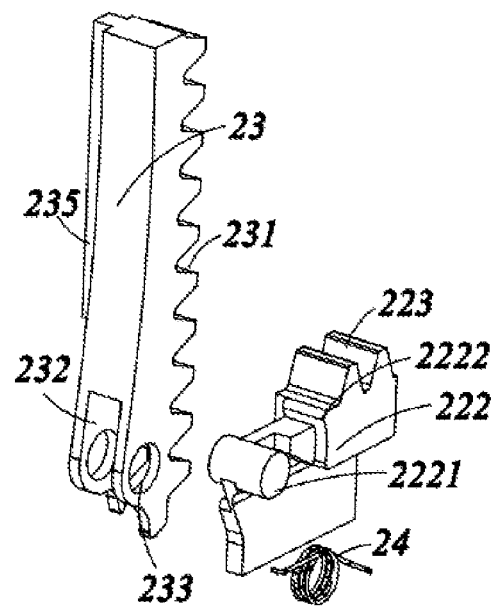
FIG. 10 is an exploded view of FIG. 9.
Figure 11:
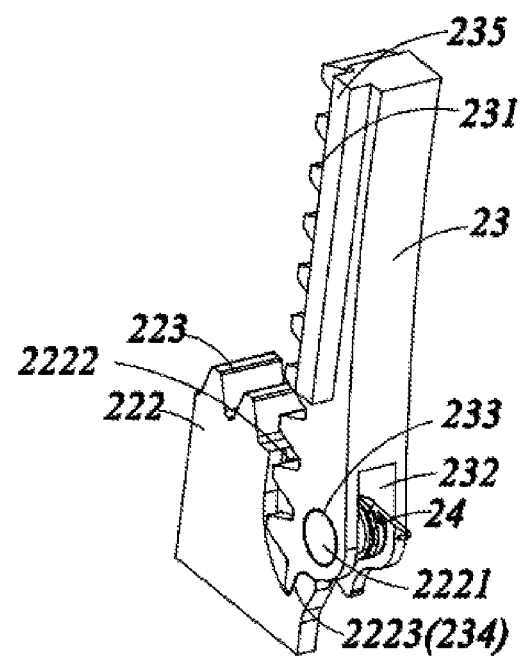
FIG. 11 is a schematic diagram of the cooperation of the main rack and the extension rack according to the first embodiment of the present invention as viewed from another angle of view.

Specifically, with reference to FIG. 9 through FIG. 11, one end of the extension rack 23 has a recessed portion 232, two openings 233 are provided on both sides of the recessed portion 232, the second end portion 222 of the main rack 22 is inserted into the recessed portion 232, and protrusions 2221 engaging with the openings 233 are disposed on both sides of the second end portion 222, so the extension rack 23 may rotate relative to the second end portion 222 of the main rack 22.

The second end portion 222 of the main rack 22 is provided with a limiting portion 2222, 2223.

Here, the limiting portion includes limiting teeth 2222 and a limiting surface 2223.

The limiting teeth 2222 are a toothed structure located at a front face of the second end portion 222. The limiting teeth 2222 may be a continuation of the main rack 22, that is, the tooth structure of the limiting teeth 2222 is consistent with the tooth structure of the main rack 22 at this time, but the arrangement is not limited thereto.

The limiting teeth 2222 and the main rack 22 may be an integrally formed structure, or may be assembled together after being separately formed.

Alternatively, the main rack 22 is formed by splicing two parts, and one part adjacent to the extension rack 23 is provided with the limiting teeth 2222.

The limiting teeth 2222 cooperate with the extension rack 23.

The limiting surface 2223 is located on the rotation path of the extension rack 23. The limiting surface 2223 is located in the region of the protrusion 2221 in the present implementation.

An adapting surface 234 that cooperates with the limiting surface 2223 is provided on the side of the extension rack 23.

A return torsion spring 24 is provided at a position where the extension rack 23 is pivotally connected with the main rack 22, and the return torsion spring 24 is sleeved around at least one protrusion 2221.

Figure 12:
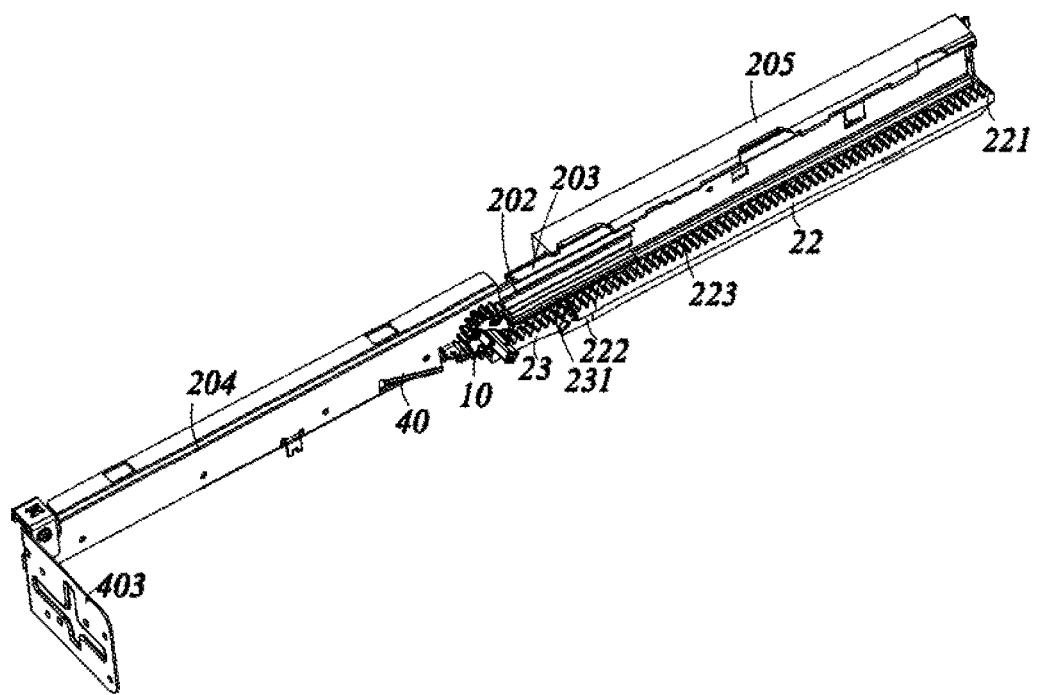
FIG. 12 is a schematic view of an open state of the drawer according to the first embodiment of the present invention.

With reference to FIG. 12, the engaging assembly 100 further includes a driving member 40.

Here, the driving member 40 is an inclined surface located on the bracket 204. The driving member 40 may be directly formed by cutting and bending a portion of the bracket 204. However, the forming of the driving member 40 is not limited thereto.

The extension rack 23 has an adapting portion 235 that cooperates with the driving member 40. Here, the adapting portion 235 is a raised edge of the extension rack 23 extending toward a side away from the drawer 400.

Referring to FIG. 7, when the drawer 400 is in the closed state, the driving member 40 is far away from the extension rack 23, the return torsion spring 24 gives the extension rack 23 an acting force to drive the extension rack 23 to rotate towards the second end portion 222, the lower end of the extension rack 23 engages with the limiting teeth 2222, the adapting surface 234 of the extension rack 23 and the limiting surface 2223 interfere with each other, the extension rack 23 cannot continue to rotate towards the second end portion 222, and the extension rack 23 is in a stationary state relative to the main rack 22.

Referring to FIG. 12, when the drawer 400 is in the opening process, the driving member 40 gradually approaches and contacts the adapting portion 235, the driving member 40 acts on the adapting portion 235 to cause the extension rack 23 to rotate away from the second end portion 222, the extension rack 23 extends beyond the second end portion 222 in a direction away from the first end portion 221, and the extension tooth surface 231 is gradually spliced with the main tooth surface 223 into a continuous tooth surface.

When the drawer 400 is in the open state, the extension tooth surface 231 is in a horizontal state, and the gear 10 abuts against the end of the extension tooth surface 231 away from the second end portion 222 to prevent the extension rack 23 from rotating toward the second end portion 222.

When the drawer 400 is in the closing process, the driving member 40 gradually disengages from the adapting portion 235, and the return torsion spring 24 returns and drives the extension rack 23 to rotate toward the second end portion 222. When the extension rack 23 rotates and contacts the limiting portion (namely, when the lower end of the extension rack 23 engages with the limiting teeth 2222, and the adapting surface 234 of the extension rack 23 and the limiting surface 2223 interfere with each other), the extension rack 23 cannot continue to rotate towards the second end portion 222.

Here, when the drawer 400 is in the closed state, an angle between the extension rack 23 and the main rack 22 ranges from 30° to 120°. Preferably, the angle between the extension rack 23 and the main rack 22 is an acute angle, but not limited to thereto.

In addition, the end of the extension rack 23 far from the second end portion 222 may be a two-segment pivotally-connected structure. In this way, when the drawer 400 is in the closed state, the two-segment pivotally-connected structure can be doubled over to reduce the space occupied by the extension rack 23. In other words, at this time, the extension rack 23 with a sufficiently long unfolded length can also be accommodated in a limited space, thereby further increasing the pull-out distance of the drawer 400.

In the present embodiment, the gear 10 is disposed on the upper rail 201, the gear 10 enters and exits with the drawer 400, and the rack 20 is fixed on the cabinet 500 or the lower rail 203.

Figure 13:
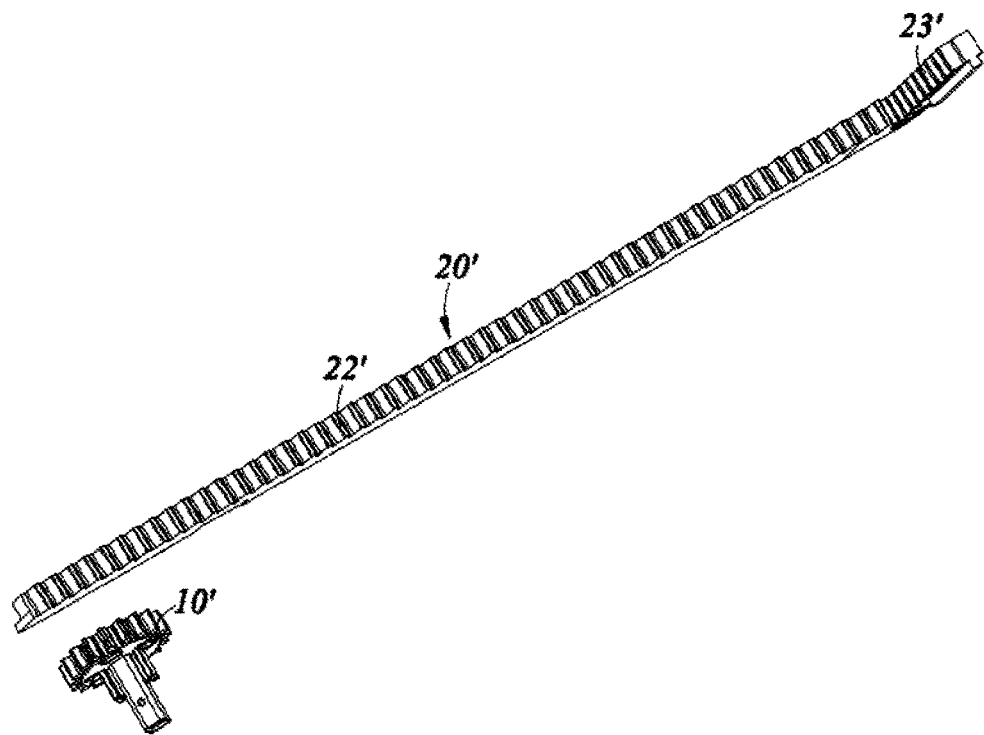
FIG. 13 is a schematic diagram of a gear and a rack according to another embodiment.

In other embodiments, with reference to FIG. 13, the positions of the gear 10 and the rack 20 are interchangeable.

Specifically, the gear 10' is fixed at the front end of the cabinet 500, i.e., the gear 10' is fixed at the opening of the cabinet 500, the rack 20' is fixed at the bracket 204, the rack 20' includes the main rack 22' and the extension rack 23' which are pivotally connected, the extension rack 23' is located at the rear end of the main rack 22', and a return torsion spring is disposed at a position where the extension rack 23' is pivotally connected with the main rack 22'.

When the drawer 400 is in the closed state, the return torsion spring gives the extension rack 23' an acting force to drive the extension rack 23' to rotate towards the main rack 22', and the extension rack 23' and the main rack 22' are in a doubled-over state and stationary relative to each other.

When the drawer 400 is in the opening process, the main rack 22' first enables the gear 10' to travel; when the gear 10' reaches the boundary between the main rack 22' and the extension rack 23', the gear 10' drives the extension rack 23' to rotate away from the main rack 22', the drawer 400 may be further pulled out, and the drawer 400 may be pulled out further.

When the drawer 400 is in the closing process, the extension rack 23' first enables the gear 10' to travel; when the gear 10' reaches the boundary between the main rack 22' and the extension rack 23', the gear 10' gradually disengages from the extension rack 23', the extension rack 23' gradually rotates toward the main rack 22' under the action of the return torsion spring, and the extension rack 23' returns.

It should be noted that this embodiment may also include a structure such as a driving member. Reference may be made to the depictions of the previous embodiment for other depictions of this embodiment, which will not be described in detail any more.

In addition, in this embodiment, the gear 10' is not necessarily fixed at the front end of the cabinet 500'. For example, the gear 10' may be movably disposed in the middle of the cabinet 500', and so on.

With reference to FIG. 14 through FIG. 17, they show schematic diagrams of a second embodiment of an engaging component 100a.

Here, for convenience of illustration, the same terms are used for structures having the same or similar functions.

The engaging assembly 100a includes a gear 10a connected to a bracket 204a and a rack 20a connected to the cabinet or a lower rail.

The rack 20a includes a main rack 22a and an extension rack 23a.

The main rack 22a has a main tooth surface 223a, and the extension rack 23a has an extension tooth surface 231a.

The main rack 22a includes a first end portion 221a and a second end portion 222a which are arranged opposite to each other. A direction from the first end portion 221a to the second end portion 222a is the direction in which the drawer 400 is opened.

A receiving space S1 is provided in a region of the main rack 22a adjacent to the second end portion 222a, and the extension rack 23a is movably disposed in the receiving space S1.

Specifically, the receiving space S1 includes a bottom portion S11 far from the main tooth surface 223a and a top portion S12 adjacent to the main tooth surface 223a.

Here, the bottom portion S11 is a lower end region of the receiving space S1, the bottom portion S11 for example may be directly a portion of the cabinet 500, and the top portion S12 is an upper end opening of the receiving space S1.

The receiving space S1 has a side wall S13 connecting the bottom portion S11 with the top portion S12.

Here, an example is taken in which the receiving space S1 has two side walls S13 disposed opposite each other.

The side wall S13 is provided with at least one travel slot S131, and the extension rack 23a is provided with a projection 232a mating with the travel slot S131.

Here, an example is taken in which each side wall S13 is provided with two travel slots S131 distributed in parallel.

An angle in a direction away from the first end portion 221a is provided between the travel slot S131 and the bottom portion S11, and the angle is an acute angle.

An elastic member 24a is provided between the extension rack 23a and the bottom portion S11.

Here, the elastic member 24a is several springs evenly distributed.

The engaging assembly 100a further includes a driving member 40a.

Here, the driving member 40a is a tab on a connecting sheet 403a and has an inclined abutment surface, but is not limited thereto.

The extension rack 23a has an adapting portion 235a that cooperates with the driving member 40a. Here, the adapting portion 235a is a portion of the extension rack 23a that the teeth project towards a region close to the bracket 204a.

Figure 14:
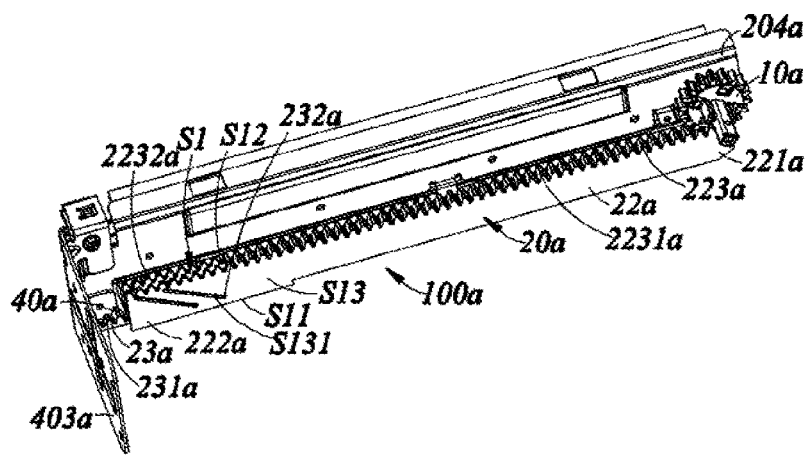
FIG. 14 is a schematic diagram of a closed state of a drawer according to a second embodiment of the present invention.
Figure 15:
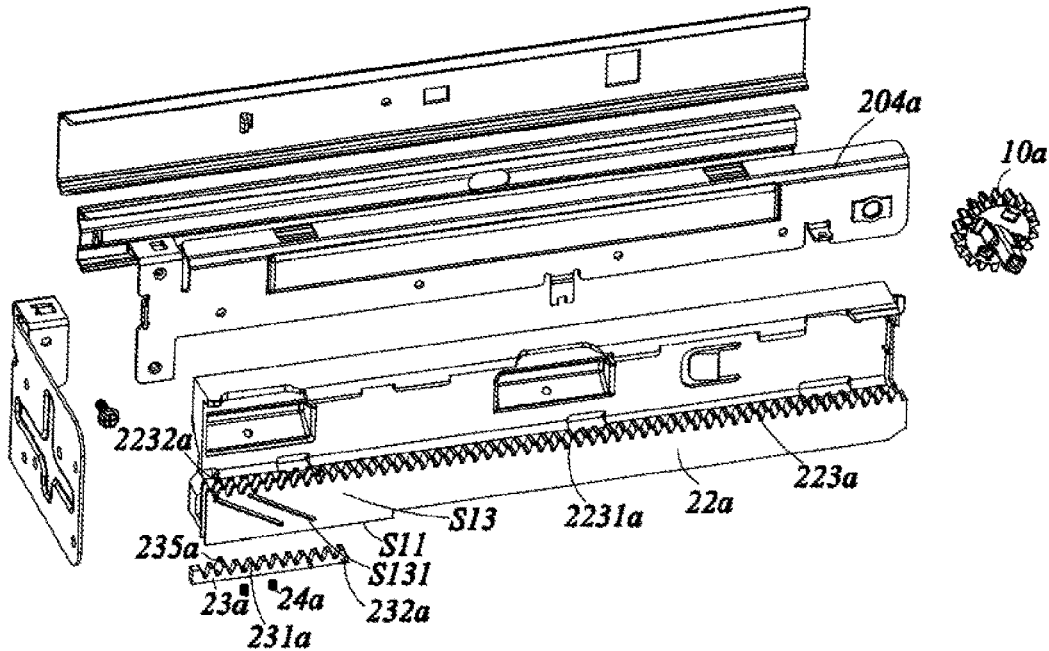
FIG. 15 is an exploded view of FIG. 14.

With reference to FIG. 14 and FIG. 15, when the drawer 400 is in the closed state, the driving member 40a abuts against the adapting portion 235a, the elastic member 24a is compressed, the extension rack 23a is located between the bottom portion S11 and the top portion S12, and the extension tooth surface 231a is in a horizontal state.

Figure 16:
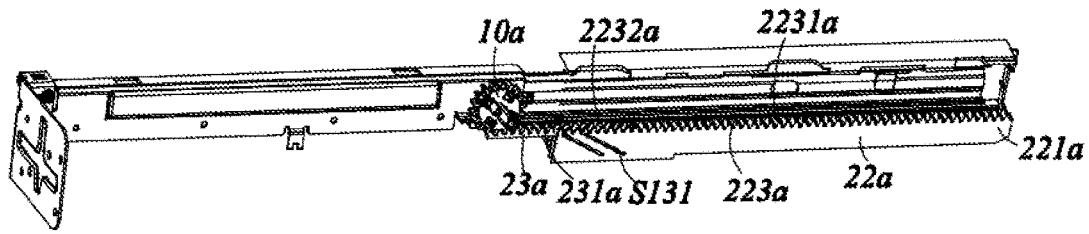
FIG. 16 is a schematic view of an open state of the drawer according to the second embodiment of the present invention.
Figure 17:
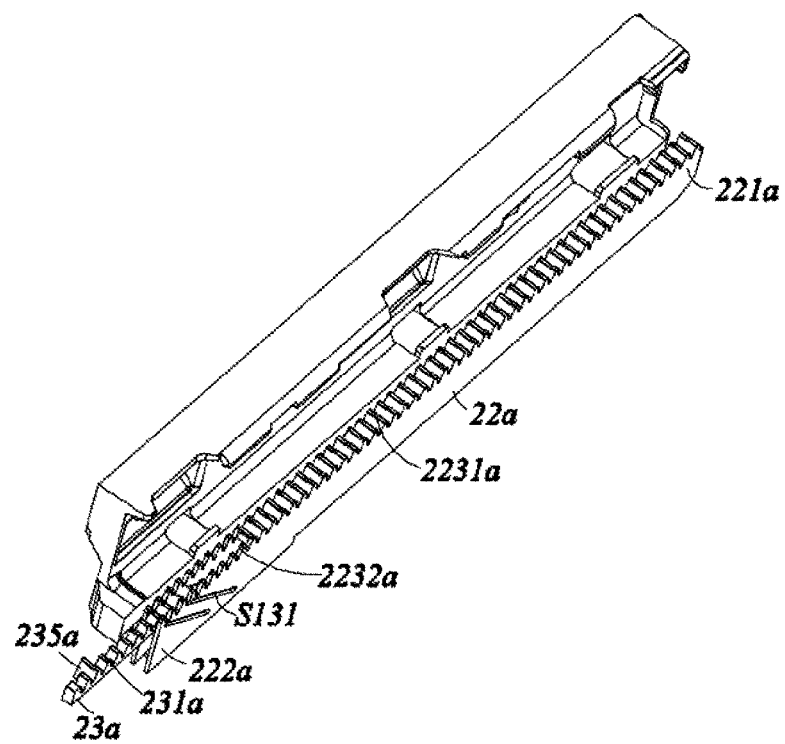
FIG. 17 is a schematic diagram of the cooperation of the main rack and the extension rack in the open state according to the second embodiment of the present invention.

Referring to FIG. 16 and FIG. 17, when the drawer 400 is in the opening process, the driving member 40a gradually disengages from the adapting portion 235a as the drawer 400 moves away from the first end portion 221a, and then the elastic member 24a returns to drive the extension rack 23a to move towards the top portion S12 in the receiving space S1, and the extension tooth surface 231a is gradually spliced with the main tooth surface 223a into a continuous tooth surface.

Here, the extension tooth surface 231a can be raised to be flush with the main tooth surface 223a (i.e., the extension tooth surface 231a and the main tooth surface 223a are spliced into a continuous tooth surface) by controlling the elasticity of the elastic member 24a, or, the rising height of the extension tooth surface 231a can be controlled by providing a limiting member at the top portion S12.

In addition, the projection 232a slides in the travel slot S131 to drive the extension rack 23a to move close to the top portion S12. Since the travel slot S131 is an inclined travel slot, when the extension rack 23a moves up close to the top portion S12, the extension rack 23a also substantially moves away from the first end portion 221a and protrudes beyond the second end portion 222a.

When the drawer 400 is in the open state, the extension tooth surface 231a is flush with the main tooth surface 223a to form a continuous tooth surface.

When the drawer 400 is in the closing process, the driving member 40a abuts against the adapting portion 235a so that the extension rack 23a moves closer to the bottom portion S11, the elastic member 24a is compressed, and the extension rack 23a returns.

In this embodiment, the main tooth surface 223a includes a rear main tooth surface 2231a located in an intermediate region between the top portion S12 and the first end portion 221a, and a front main tooth surface 2232a located at the top portion S12, and the rear main tooth surface 2231a is continuous with the front main tooth surface 2232a.

In this way, when the extension tooth surface 231a rises to the top portion S12, the extension tooth surface 231a is substantially located between two rows of front main tooth surfaces 2232a, and the teeth of the extension tooth surface 231a align with teeth of the front main tooth surface 2232a.

The advantages of setting the front main tooth surface 2232a are as follows: (1) when some errors occur with the alignment between the extension tooth surface 231a and the front main tooth surface 2232a, adjustment can be made through the front main tooth surface 2232a; (2) when the extension tooth surface 231a is not docked with the rear main tooth surface 2231a (i.e., there is a gap between the extension tooth surface 231a and the rear main tooth surface 2231a), the front main tooth surface 2232a may compensate the gap between the extension tooth surface 231a and the rear main tooth surface 2231a, so that the gear 10a may travel continuously, to put it another way, the accuracy requirements for the extension tooth surface 231a also reduce; (3) the tooth width formed by the extension tooth surface 231a and the front main tooth surface 2232a becomes larger, which may improve the stability in engaging with the gear 10a.

The cooperation between the extension rack 23a and the main rack 22a may be in various forms, and a few examples are presented below for illustration.

Figure 18:
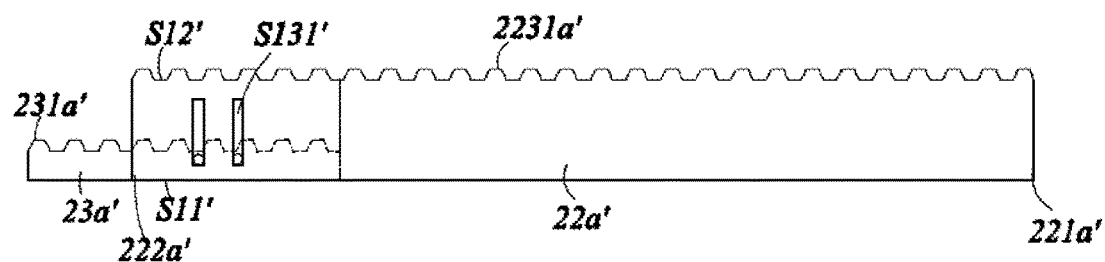
FIG. 18 through FIG. 21 are schematic diagrams of the cooperation of the main rack and the extension rack in other embodiments.
Figure 19:
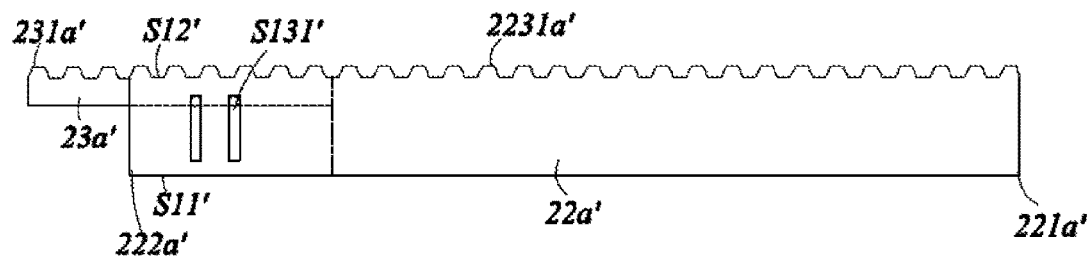

With reference to FIG. 18 and FIG. 19, the travel slot S131' is a vertical travel slot.

Referring to FIG. 18, when the drawer 400 is in the closed state, the extension rack 23a' is located between the bottom portion S11' and the top portion S12', and a distance through which one end of the extension rack 23a' protrudes beyond the second end portion 222a' of the main rack 22a' is a first distance.

Referring to FIG. 19, when the drawer 400 is in the opening process, the extension rack 23a' rises in the vertical direction due to the limitation of the travel slot S131'. When the extension rack 23a' rises to the top portion S12', the extension tooth surface 231a' is continuous with the rear main tooth surface 2231a', the distance through which the extension rack 23a' protrudes beyond the second end portion 222a' of the main rack 22a' is still the first distance.

Figure 20:
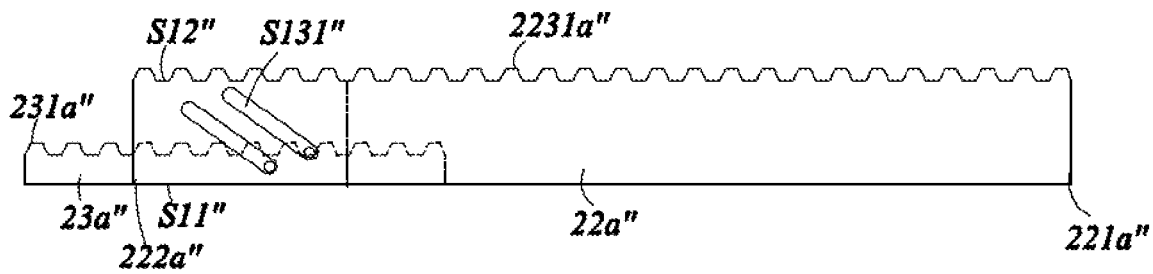
Figure 21:
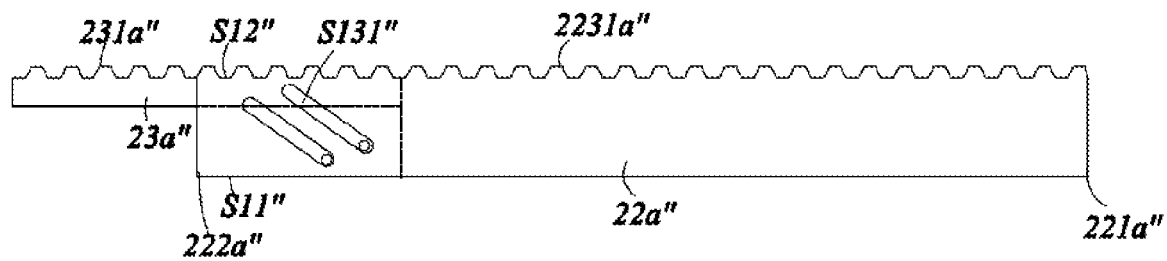

With reference to FIG. 20 and FIG. 21, the travel slot S131" is an inclined travel slot. When the drawer is in the closed state, the extension rack 23a" is located between the bottom portion S11" and the top portion S12", a distance through which one end of the extension rack 23a" protrudes beyond the second end portion 222a" of the main rack 22a" is a second distance, and the other end of the extension rack 23a" protrudes beyond the rear main tooth surface 2231a" (i.e., there is an overlapping region between the extension rack 23a" and the rear main tooth surface 2231a" at this time).

Referring to FIG. 20, when the drawer 400 is in the opening process, the extension rack 23a" rises obliquely due to the limitation of the travel slot S131"; when the extension rack 23a" rises to the top portion S12", the extension rack 23a" is continuous with the rear main tooth surface 2231a", and the distance of the extension rack 23a" protruding beyond the second end portion 222a" of the main rack 22a" is greater than the second distance.

With reference to FIG. 22 through FIG. 29, they show schematic diagrams of a third embodiment of an engaging assembly 100b.

Here, for convenience of illustration, the same terms are used for structures having the same or similar functions.

Figure 22:
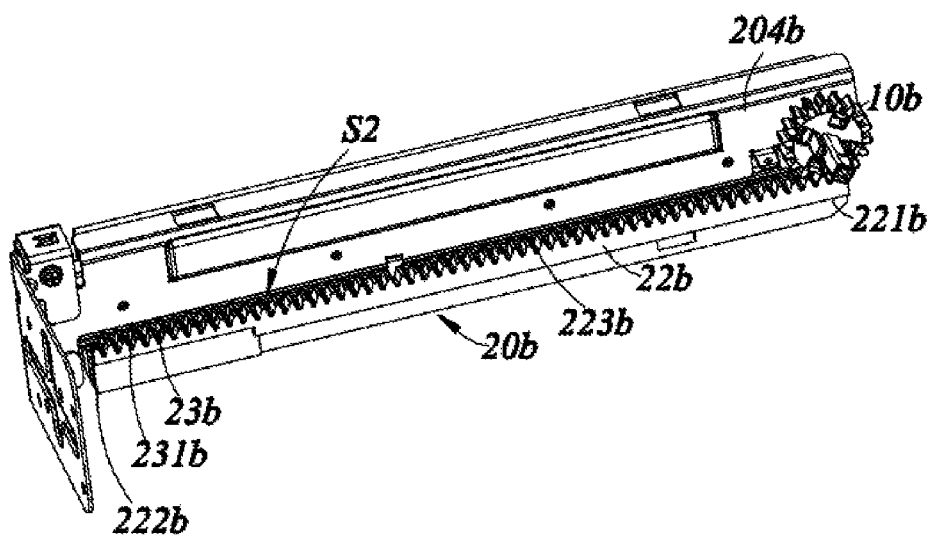
FIG. 22 is a schematic diagram of a closed state of a drawer according to a third embodiment of the present invention.
Figure 23:
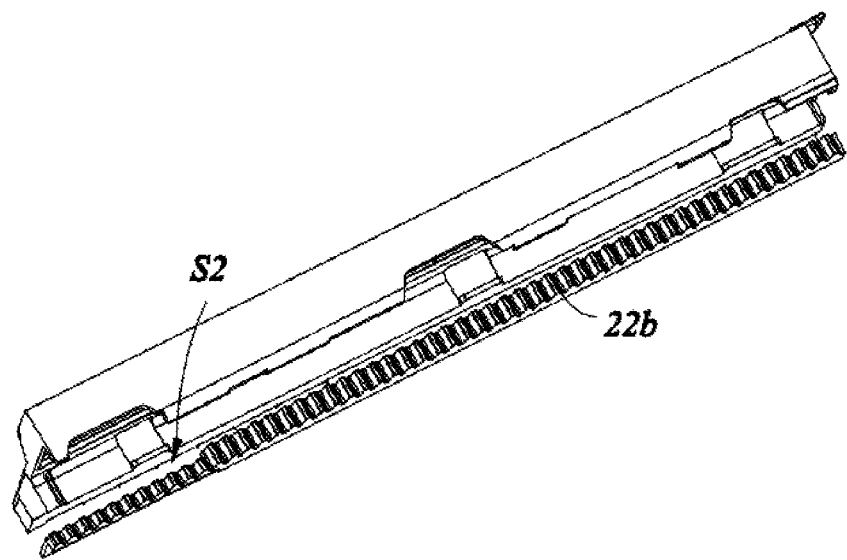
FIG. 23 is a schematic diagram of a main rack region according to a third embodiment of the present invention.
Figure 24:
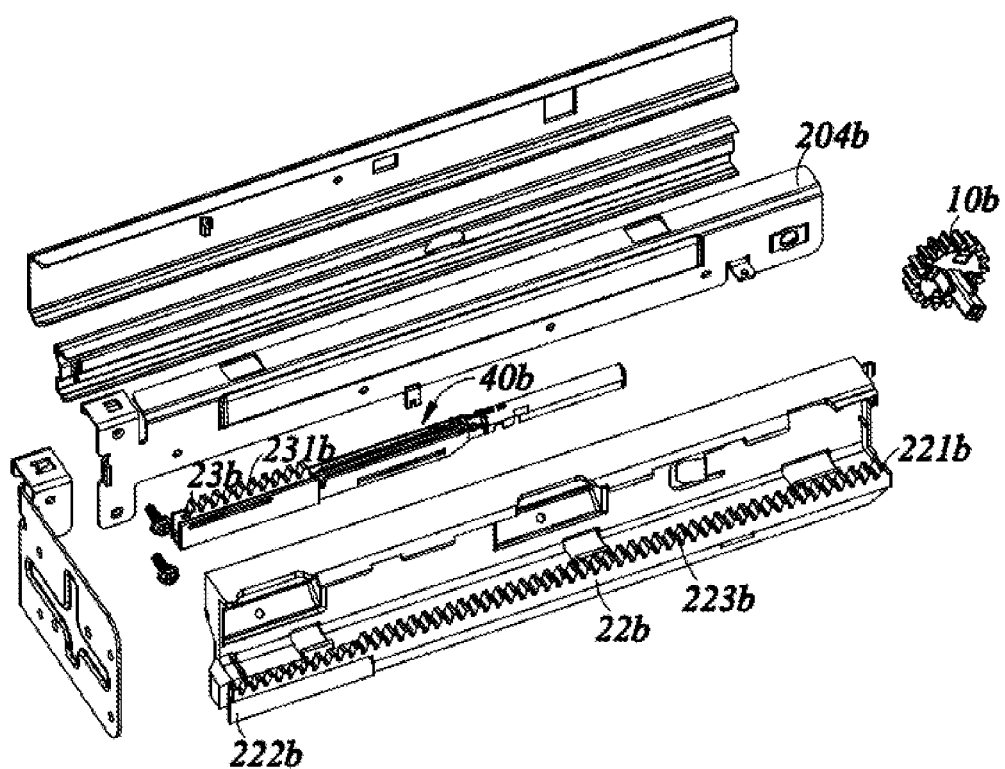
FIG. 24 is an exploded view of FIG. 22.

With reference to FIG. 22 through FIG. 24, the engaging assembly 100b includes a gear 10b connected to a bracket 204b and a rack 20b connected to a cabinet or a lower rail.

The rack 20b includes a main rack 22b and an extension rack 23b.

The main rack 22b has a main tooth surface 223b, and the extension rack 23b has an extension tooth surface 231b.

The main rack 22b includes a first end portion 221b and a second end portion 222b which are arranged opposite to each other. A direction from the first end portion 221b to the second end portion 222b is the direction in which the drawer is opened.

A receiving space S2 is provided in a region of the main rack 22b close to the second end portion 222b, the extension rack 23b is movably disposed in the receiving space S2, and the extension rack 23b and the receiving space S2 cooperate with each other so that the extension tooth surface 231b and the main tooth surface 223b are always at the same height.

Here, the receiving cavity S2 is a cavity formed between the main rack 22b and the bracket 204a.

Figure 25:
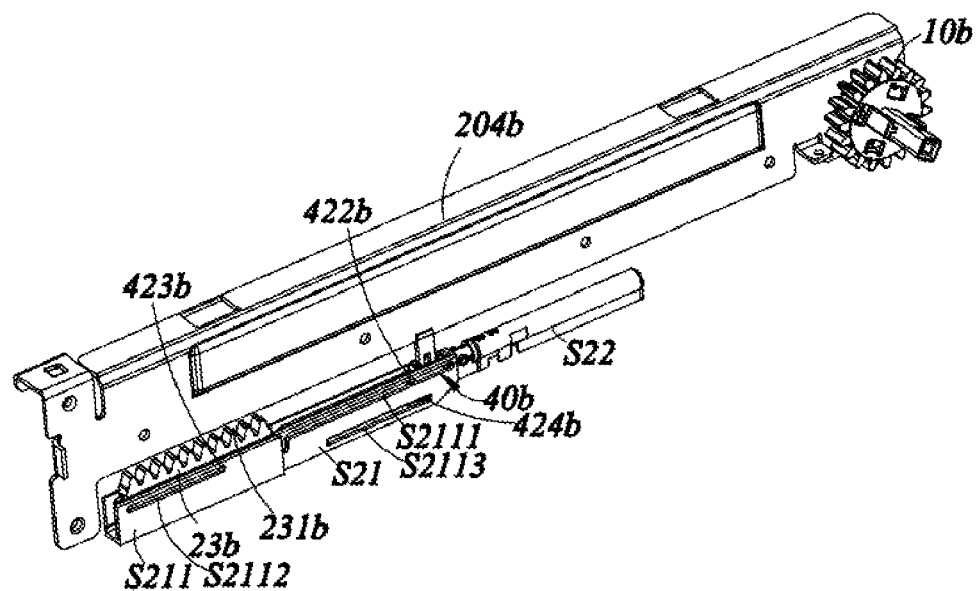
FIG. 25 is a schematic diagram with the main rack omitted in the third embodiment of the present invention.
Figure 26:
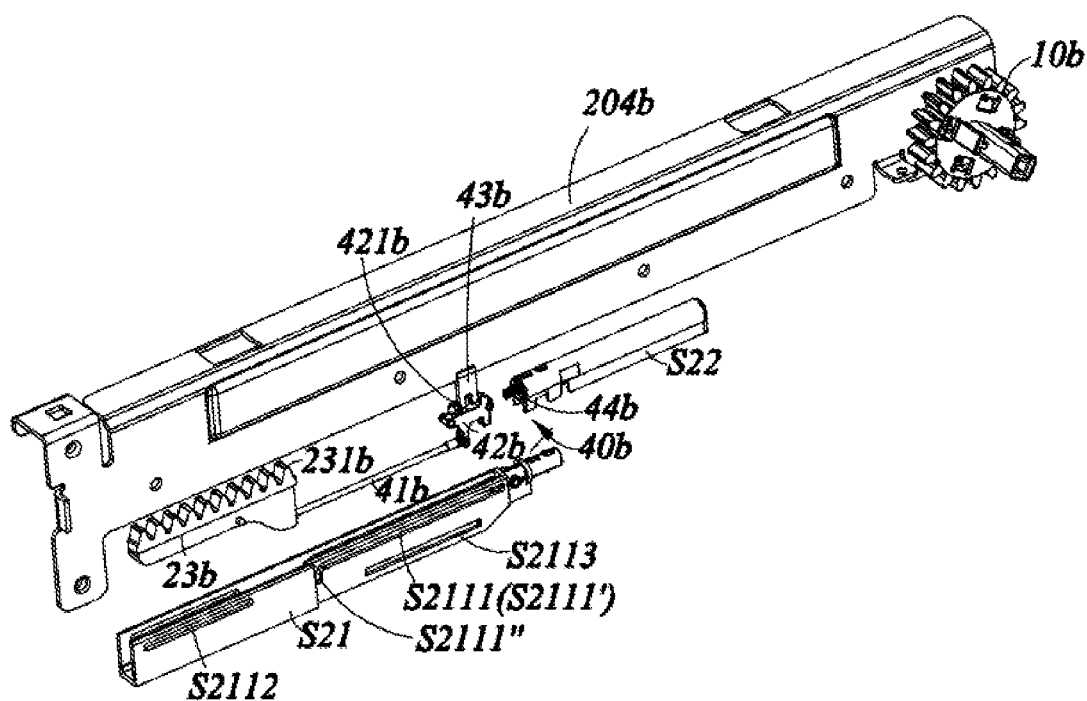
FIG. 26 is an exploded view of FIG. 25.
Figure 27:
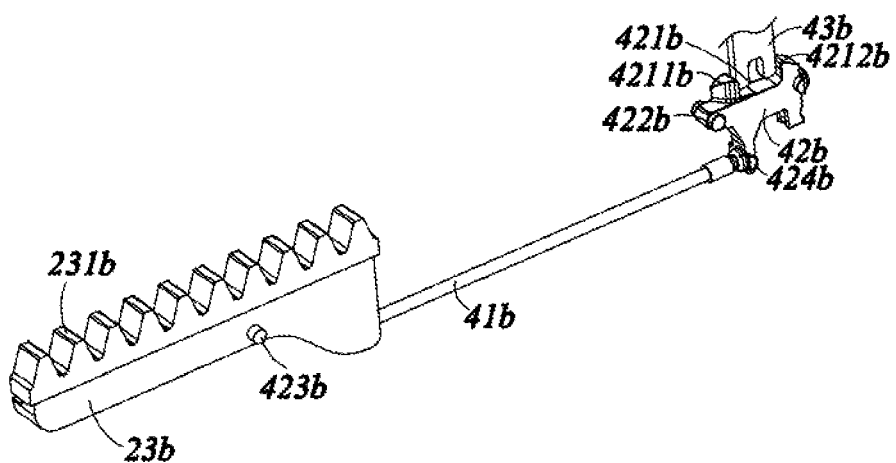
FIG. 27 is a schematic diagram of the cooperation of the extension rack and a driving member according to the third embodiment of the present invention.

Specifically, with reference to FIG. 25 through FIG. 27, the engaging assembly 100b further includes a driving member 40b which is connected to the extension rack 23b.

Here, the driving member 40b includes a link 41b, a slider 42b and a driving block 43b.

The link 41b is a rigid link.

The link 41b is used to connect the extension rack 23b with the slider 42b, the link 41b is fixedly connected with the extension rack 23b, and the link 41b is rotatably connected with the slider 42b, i.e., the slider 42b is rotatable relative to the link 41b.

The slider 42b is provided with a notch 421b that fits the driving block 43b.

The notch 421b is surrounded by a first bump 4211b and a second bump 4212b, the first bump 4211b is disposed adjacent to the second end portion 222b, and the second bump 4212b is disposed adjacent to the first end portion 221b.

The driving block 43b is a rigid member in the middle of the bracket 204b.

The driving member 40b further includes a return spring 44b connected to the slider 42b.

A fixing seat S22 for accommodating the return spring 44b is disposed in the receiving space S2.

The fixing seat S22 and the cabinet are fixed to each other.

One end of the return spring 44b is fixedly connected to the fixing seat S22, and the other end is connected to the slider 42b.

An accommodating slot S21 for accommodating the driving member 40b and the extension rack 23b is disposed in the receiving space S2.

The accommodating slot S21 and the cabinet are fixed to each other, and one end of the accommodating slot S21 is connected to the fixing seat S22.

The accommodating slot S21 includes two opposite side walls S211, each side wall S211 has a first slot S2111, a second slot S2112 and a third slot S2113, and the second slot S2112 and the third slot S2113 have equal lengths.

The first slot S2111 includes a first section S2111' adjacent to the first end portion 221b and a second section S2111" adjacent to the second end portion 222b. The second section S2111" is away from the main tooth surface 223b relative to the first section S2111'.

That is, the first slot S2111 is an "L"-shaped slot, and the second section S2111" extends downward relative to the first slot S2111.

The first slot S2111 is substantially parallel to the second slot S2112, and the third slot S2113 is located below the first slot S2111.

Here, two connected first posts 422b are disposed at an end of the slider 42b adjacent to the notch 421b, a second post 423b is disposed on a lateral side of the extension rack 23b, and a third post 424b is disposed at the connection of the slider 42b and the link 41b.

The first slot S2112 engages with two first posts 422b to restrict the moving direction of the slider 42b, the second slot S2112 engages with the second post 423b to restrict the moving direction of the extension rack 23b, and the third slot S2113 engages with the third post 424b to restrict the moving direction of the third post 424b.

Here, the connection of the extension rack 23b and the link 41b is defined as a connection point, and the connection line between the connection point, the second post 423b and the third post 424b forms an obtuse triangle, which is stable in structure and may ensure the stability of the movement of the extension rack 23b.

Referring to FIG. 22 through FIG. 27, when the drawer 400 is in the closed state, the driving block 43b is located in the notch 421b and engages with the slider 42b.

Figure 28:
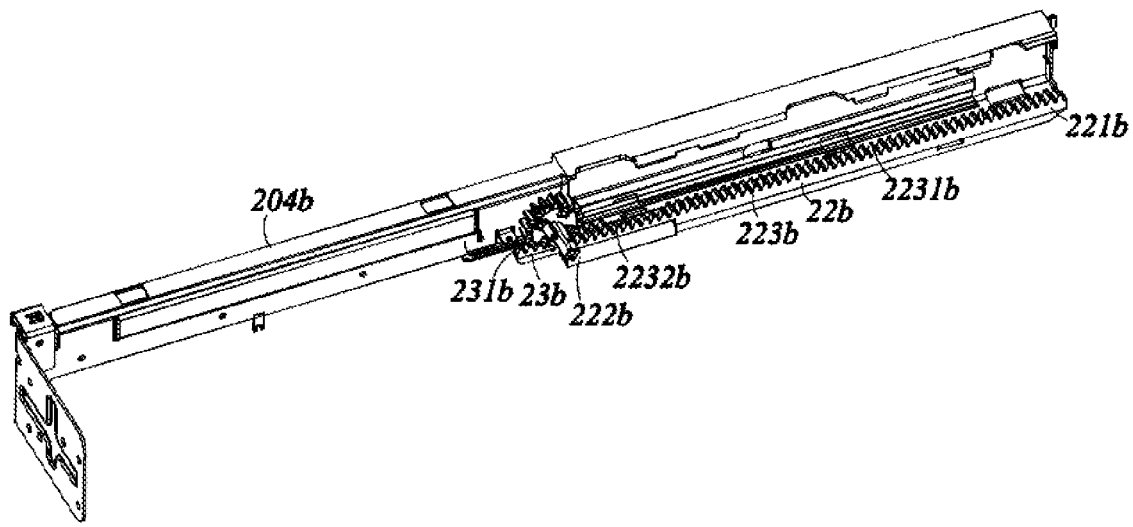
FIG. 28 is a schematic diagram of an open state of a drawer according to the third embodiment of the present invention.

Referring to FIG. 28, when the drawer 400 is in the opening process, the driving block 43b drives the extension rack 23b to move away from the first end portion 221b via the slider 42b and the link 41b, and the return spring 44b is stretched.

Figure 29:
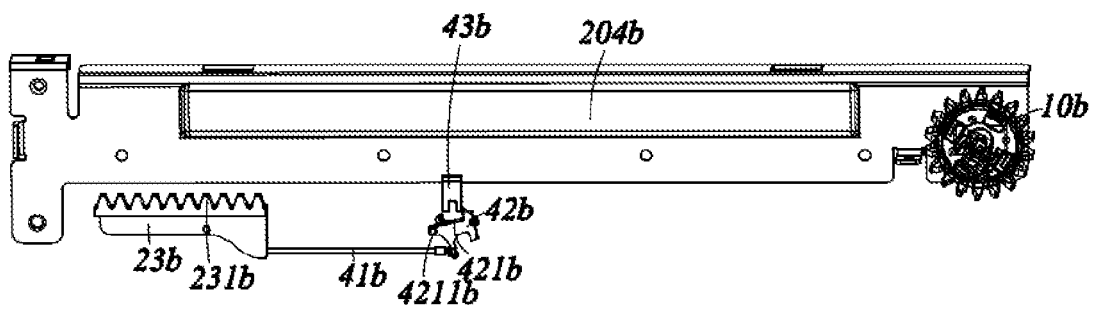
FIG. 29 is a schematic diagram of a drawer return process according to the third embodiment of the present invention.

Specifically, with reference to FIG. 29, the driving block 43b drives the slider 42b to travel from the first section S2111' to the second section S2111". Since the second section S2111" is lower than the first section S2111', the slider 42b rotates relative to the link 41b in a direction away from the first end portion 221b, the first bump 4211b of the notch 421b inclines downwards to cause the driving block 43b to disengage from the notch 421b, and the slider 42b is located in the second section S2111". At this time, the extension rack 23b has moved in a direction away from the first end portion 221b and protruded beyond the second end portion 222b, and the extension tooth surface 231b and the main tooth surface 223b are spliced into a continuous tooth surface.

That is, since the extension tooth surface 231b and the main tooth surface 223b are always at the same height, only the horizontal movement of the extension rack 23b can cause the extension rack 23b to protrude beyond the second end portion 222b.

When the drawer 400 is in the open state, the extension tooth surface 231b is flush with the main tooth surface 223b to form a continuous tooth surface.

When the drawer 400 is in the closing process, the driving block 43b drives the extension rack 23b to move toward the first end portion 221b via the slider 42b and the link 41b.

Specifically, at this time, the slider 42b is located in the second section S2111", and the first bump 4211b is in a downwardly inclined state, the driving block 43b enters the notch 421b across the first bump 4211b (namely, an inclined side bump), the return spring 44b returns and drives the slider 42b to rotate toward the first end portion 221b, the slider 42b returns so that the driving block 43b and the notch 421b engage with each other, the return spring 44bcontinues to act on the slider 42b, the first bump 4211b acts on the driving block 43b, then the driving block 43b drives the slider 42b to travel from the second section S2111" to the first section S2111', and then the return spring 44b continues to drive, via the slider 42b, the driving block 43b, the link 41b and the extension rack 23b to move together toward the first end portion 221b and return.

It should be appreciated that in the present implementation, the cooperation of the return spring 44b, the slider 42b and the driving block 43b is used to implement the return of the engaging assembly 100b. This return structure may also be incorporated into the first and second embodiments described above, which will not be detailed any more here.

In the present embodiment, the main tooth surface 223b includes a rear main tooth surface 2231b adjacent to the first end portion 221b and a front main tooth surface 2232b adjacent to the second end portion 222b, and the rear main tooth surface 2231b is continuous with the front main tooth surface 2232b.

When the drawer 400 is in the closed state, the extension tooth surface 231b is disposed adjacent to the front main tooth surface 2232b. Preferably, at this time, the extension tooth surface 23b, the front main tooth surface 2232b and the rear main tooth surface 2231b are tightly spliced together.

When the drawer 400 is in the opening process, the extension tooth surface 231b moves in a direction away from the front main tooth surface 2232b so that the extension tooth surface 231b protrudes beyond the second end portion 222b.

When the drawer 400 is in the closing process, the extension tooth surface 231b moves toward the front main tooth surface 2232b and returns.

The advantages of setting the front main tooth surface 2232b are as follows: (1) when some errors occur with the alignment between the extension tooth surface 231a and the front main tooth surface 2232b, adjustment can be made through the front main tooth surface 2232a; (2) when the extension tooth surface 231b is not docked with the rear main tooth surface 2231b (i.e., there is a gap between the extension tooth surface 231b and the rear main tooth surface 2231b), the front main tooth surface 2232a may compensate the gap between the extension tooth surface 231b and the rear main tooth surface 2231b, so that the gear 10b may travel continuously, to put it another way, the accuracy requirements for the extension tooth surface 231b also reduce; (3) the tooth width formed by the extension tooth surface 231b and the front main tooth surface 2232b becomes larger, which may improve the stability in engaging with the gear 10b.

In addition, the total width formed by the extension tooth surface 231 b and the front main tooth surface 2232b in the present embodiment is preferably larger than the width of the rear main tooth surface 2231b. On the one hand, the stability in engaging with the gear 10b may be improved, and on the other hand, the width of the extension tooth surface 231b may be appropriately increased to improve the stability of the horizontal movement of the extension rack 23b.

It should be understood that although the description is described according to the embodiments, not every embodiment only includes one independent technical solution, that such a description manner is only for the sake of clarity, that those skilled in the art should take the description as an integral part, and that the technical solutions in the embodiments may be suitably combined to form other embodiments understandable by those skilled in the art.

The detailed descriptions set forth above are merely specific illustrations of feasible embodiments of the present invention, and are not intended to limit the scope of protection of the present invention. All equivalent embodiments or modifications that do not depart from the art spirit of the present invention should fall within the scope of protection of the present invention.

The invention claimed is:

1. An engaging assembly for assisting in opening or closing a drawer, wherein the engaging assembly comprises a gear configured to engage with the drawer and a rack configured to engage with a cabinet, the rack comprises a tooth surface enabling the gear to travel along the tooth surface, and the rack comprises a main rack and an extension rack; when the drawer is in a closed state, the tooth surface has a first travel length; when the drawer is in an opening process, the extension rack moves onto a travel path of the gear so that the tooth surface has a second travel length; when the drawer is in a closing process, the extension rack returns, and the first travel length is shorter than the second travel length;

the main rack comprises a first end portion and a second end portion which are arranged opposite to each other, a direction from the first end portion to the second end portion is a direction in which the drawer is opened, a receiving space is disposed in a region adjacent to the second end portion, and the extension rack is movably disposed in the receiving space; when the drawer is in the opening process, the extension rack moves in the receiving space so that the extension rack protrudes beyond the second end portion in a direction away from the first end portion;

the main rack comprises a main tooth surface, the extension rack has an extension tooth surface, and when the drawer is in the opening process, the extension rack moves in the receiving space so that the extension tooth surface and the main tooth surface are spliced into a continuous tooth surface;

the receiving space comprises a bottom portion away from the main tooth surface and a top portion adjacent to the main tooth surface; when the drawer is in the closed state, the extension rack is located between the bottom portion and the top portion; when the drawer is in the opening process, the extension rack moves close to the top surface so that the extension tooth surface and the main tooth surface are spliced into the continuous tooth surface.

2. The engaging assembly according to claim 1, wherein the main tooth surface comprises a rear main tooth surface located in an intermediate region between the top portion and the first end portion, and a front main tooth surface located at the top portion, and the rear main tooth surface is continuous with the front main tooth surface.

3. The engaging assembly according to claim 1, wherein the engaging assembly further comprises a driving member, and the extension rack has an adapting portion that engages with the driving member; when the drawer is in a closed state, the driving member abuts against the adapting portion so that the extension rack is located between the bottom portion and the top portion; when the drawer is in the opening process, the driving member disengages from the adapting portion to cause the extension rack to move close to the top portion; when the drawer is in the closing process, the driving member abuts against the adapting portion so that the extension rack moves close to the bottom portion.

4. The engaging assembly according to claim 3, wherein an elastic member is provided between the extension rack and the bottom portion, and when the driving member disengages from the adapting portion, the elastic member drives the extension rack to move close to the top portion.

5. The engaging assembly according to claim 4, wherein the receiving space has a side wall connecting the bottom portion with the top portion, the side wall is provided with at least one travel slot, and the extension rack is provided with a projection mating with the travel slot; when the driving member disengages from the adapting portion, the projection slides in the travel slot to drive the extension rack to move closer to the top portion.

6. The engaging assembly according to claim 5, wherein an angle in a direction away from the first end portion is provided between the travel slot and the bottom portion, and the angle is an acute angle.

7. The engaging assembly according to claim 6, wherein the receiving space has two side walls disposed opposite each other, and each side wall has two travel slots distributed in parallel.

8. A drawer, configured to be received in a cabinet and movable out from or into the cabinet, wherein the drawer comprises a slide rail mechanism, the slide rail mechanism comprises a slide rail assembly and an engaging assembly, the engaging assembly comprises a gear configured to engage with a side of the drawer and a rack configured to engage with a cabinet, the rack comprises a tooth surface enabling the gear to travel along the tooth surface, and the rack comprises a main rack and an extension rack; when the drawer is in a closed state, the tooth surface has a first travel length; when the drawer is in an opening process, the extension rack moves onto a travel path of the gear so that the tooth surface has a second travel length; when the drawer is in a closing process, the extension rack returns, and the first travel length is shorter than the second travel length;

the main rack comprises a first end portion and a second end portion which are arranged opposite to each other, a direction from the first end portion to the second end portion is a direction in which the drawer is opened, a receiving space is disposed in a region adjacent to the second end portion, and the extension rack is movably disposed in the receiving space; when the drawer is in the opening process, the extension rack moves in the receiving space so that the extension rack protrudes beyond the second end portion in a direction away from the first end portion;

the main rack comprises a main tooth surface, the extension rack has an extension tooth surface, and when the drawer is in the opening process, the extension rack moves in the receiving space so that the extension tooth surface and the main tooth surface are spliced into a continuous tooth surface;

the receiving space comprises a bottom portion away from the main tooth surface and a top portion adjacent to the main tooth surface; when the drawer is in the closed state, the extension rack is located between the bottom portion and the top portion; when the drawer is in the opening process, the extension rack moves close to the top surface so that the extension tooth surface and the main tooth surface are spliced into the continuous tooth surface;

the slide rail assembly has an upper rail, a middle rail and a lower rail that are slidingly fitted to each other, the lower rail is configured to be connected to the cabinet, the middle rail is movably connected to the upper rail and the lower rail, the upper rail is configured to be connected to a side of the drawer, the gear is connected to the upper rail, and the rack is configured to be connected to a selective one of the cabinet and the lower rail.

9. A refrigerator, wherein the refrigerator comprises a drawer and a cabinet for receiving the drawer therein, wherein:

the drawer comprises a slide rail mechanism, the slide rail mechanism comprises a slide rail assembly and an engaging assembly, the engaging assembly comprises a gear configured to engage with a side of the drawer and a rack configured to engage with a cabinet, the rack comprises a tooth surface enabling the gear to travel along the tooth surface, and the rack comprises a main rack and an extension rack; when the drawer is in a closed state, the tooth surface has a first travel length; when the drawer is in an opening process, the extension rack moves onto a travel path of the gear so that the tooth surface has a second travel length; when the drawer is in a closing process, the extension rack returns, and the first travel length is shorter than the second travel length;

the main rack comprises a first end portion and a second end portion which are arranged opposite to each other, a direction from the first end portion to the second end portion is a direction in which the drawer is opened, a receiving space is disposed in a region adjacent to the second end portion, and the extension rack is movably disposed in the receiving space; when the drawer is in the opening process, the extension rack moves in the receiving space so that the extension rack protrudes beyond the second end portion in a direction away from the first end portion;

the main rack comprises a main tooth surface, the extension rack has an extension tooth surface, and when the drawer is in the opening process, the extension rack moves in the receiving space so that the extension tooth surface and the main tooth surface are spliced into a continuous tooth surface;

the receiving space comprises a bottom portion away from the main tooth surface and a top portion adjacent to the main tooth surface; when the drawer is in the closed state, the extension rack is located between the bottom portion and the top portion; when the drawer is in the opening process, the extension rack moves close to the top surface so that the extension tooth surface and the main tooth surface are spliced into the continuous tooth surface;

the slide rail assembly has an upper rail, a middle rail and a lower rail that are slidingly fitted to each other, the lower rail is configured to be connected to the cabinet, the middle rail is movably connected to the upper rail and the lower rail, the upper rail is configured to be connected to a side of the drawer, the gear is connected to the upper rail, and the rack is configured to be connected to a selective one of the cabinet and the lower rail.

* * * * *